INVENTOR.
Adolph John Ewasko

United States Patent Office 3,473,306
Patented Oct. 21, 1969

3,473,306
ATTACHMENT FOR UNIFORM DISPERSAL
OF THE GRASS MULCH
Adolph J. Ewasko, 20 Amherst Court,
Parlin, N.J. 08872
Filed Feb. 7, 1966, Ser. No. 525,552
Int. Cl. A01d 35/12
U.S. Cl. 56—25.4                      2 Claims

ABSTRACT OF THE DISCLOSURE

In a rotary mower, there are provided rotating members above and attached to the mower blades, for intercepting and dispersing grass cuttings, preventing clumping and build-up of cuttings in the blade housing, and uniformly dispersing the mulch.

---

This invention relates to attachments on grass cutting blades of a lawnmower, and more particularly an attachment for uniform dispersal of the grass mulch.

It is therefore the main purpose of this invention to provide an attachment for uniform dispersal of the grass mulch which is mounted on the blade of a rotary lawnmower and is adapted to uniformly disperse grass and mulch clippings for preventing them to enter the motor section of a lawnmower.

Another object of this invention is to provide an attachment for uniform dispersal of the grass mulch which is adapted to eliminate a need for cleaning the bottom portion of a rotary lawnmower from the mulch.

Another object of this invention is to provide an attachment for uniform dispersal of the grass mulch which is adapted to protect the motor of a rotary lawnmower from stalling due to accumulation of mulch around the shaft portion of the motor.

Still another object of this invention is to provide an attachment for uniform dispersal of grass mulch which can be readily secured to conventional rotary blades, is of rigid construction and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit and the scope of the appended claims.

Figure 1:
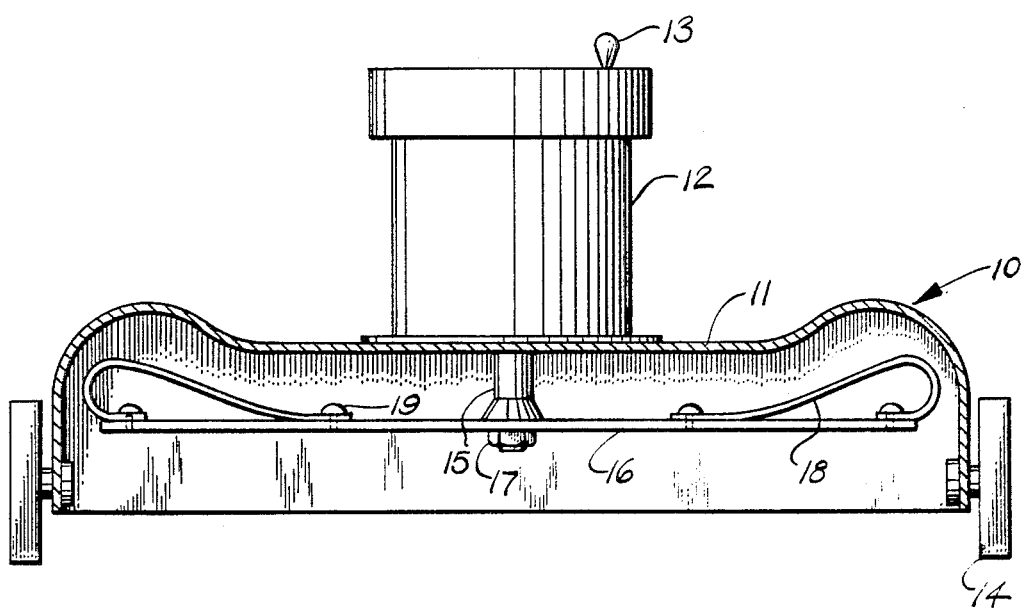
FIGURE 1 is a front elevational view with the front section cut away.
Figure 2:
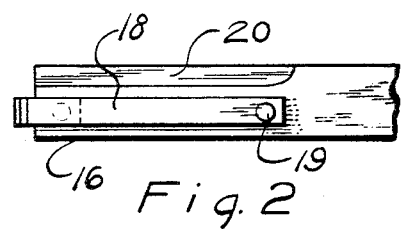
FIGURE 2 is a fragmentary plan view of the left side of blade showing the attachment secured to said blade.

According to this invention, attachment 18 is provided within lawnmower 11, said lawnmower includes a motor 12 controlled by switch 13 and is supported by wheels 14. A downwardly disposed shaft 15 is adapted to rotate an elongated blade member 16 in accordance with the operation of the motor 12. Blade member 16 is secured to shaft 15 by means of a lock nut 17. Blade member 16 is provided with at least one cutting edge 20 at each end thereof. Attachment 18 is secured to the top portion of said blade 16 by means of rivets 19 or any other suitable means. Attachment 18 thereby eliminates the mulch that normally would gather underneath the frame portion of the lawnmower 11.

It will also be noted that the configuration of attachment 18 as shown in FIGURE 1 may be suitably changed to approximate the contours of the underside portion of the rotary lawnmower 11.

What I now claim is:

1. In a rotary lawmower comprising a supporting and housing structure, a motor mounted on said structure, a rotatable shaft extending downwardy from said motor, and an elongated blade member secured to said shaft for rotation about said shaft in a generally horizontal plane within said supporting and housing structure, the improvement wherein said blade has attached to the upper side thereof a mulch-distributing member of elongated form comprising two ends and an intermediate portion, said ends being secured to said blade and said intermediate portion being spaced above said blade, said intermediate portion of said mulch-distribution member being shaped to provide an arcuate bight projecting beyond and substantially overlying the end of said blade.

2. In a rotary lawnmower comprising a supporting and housing structure, a motor mounted on said structure, a rotatable shaft extending downwardly from said motor, and an elongated blade member secured, to said shaft for rotation about said shaft in a generally horizontal plane within said supporting and housing structure, the improvement wherein said blade has attached to the upper said thereof a mulch-distributing member of elongated form comprising two ends and an intermediate portion, said ends being secured to said blade and said intermediate portion being spaced above said blade, said intermediate portion of said mulch distributing member being shaped to provide an arcuate bight substantially overlying the end of said blade, said mulch-distributing member having a leading edge spaced closely behind the leading edge of said blade in the direction of travel thereof.

References Cited

UNITED STATES PATENTS

| 2,697,322 | 12/1954 | Watrous | 56—25.4 |
| 2,760,327 | 8/1956 | Bouee | 56—25.4 |
| 2,762,188 | 9/1956 | Klein | 56—295 |
| 2,764,865 | 10/1956 | Pollard | 56—295 |
| 2,806,339 | 9/1957 | Whitney | 56—25.4 |

ROBERT PESHOCK, Primary Examiner
PASQUALE A. RAZZANO, Assistant Examiner